United States Patent [19]

Bond et al.

[11] 4,445,551

[45] May 1, 1984

[54] QUICK-DISCONNECT COUPLING AND VALVE ASSEMBLY

[76] Inventors: Curtis J. Bond, 4611 Donithen Rd., Marion, Ohio 43302; John G. Ulm, Orchard Dr., Upper Sandusky, Ohio 43351

[21] Appl. No.: 319,580

[22] Filed: Nov. 9, 1981

[51] Int. Cl.³ .............................................. B65B 3/04
[52] U.S. Cl. ................................. 141/349; 215/307; 215/311; 217/98; 217/99; 220/360; 251/149.1; 251/291; 251/353; 383/904
[58] Field of Search ...................... 251/149.1, 291, 353; 220/360; 150/8; 217/98, 99; 215/307, 311; 141/349, 348, 350, 346, 347, 351–362

[56] References Cited

U.S. PATENT DOCUMENTS

| | | | |
|---|---|---|---|
| 1,311,745 | 7/1919 | Beurmann . | |
| 2,597,250 | 5/1952 | Kollsman | 141/351 |
| 2,816,690 | 12/1957 | Lari | 141/351 |
| 2,950,835 | 8/1960 | Alvear . | |
| 3,184,091 | 7/1962 | Hoffman . | |
| 3,223,117 | 12/1965 | Curie et al. . | |
| 4,137,930 | 2/1979 | Scholle | 137/68 R |
| 4,286,636 | 9/1981 | Credle . | |
| 4,353,488 | 10/1982 | Schneiter et al. | 222/501 |
| 4,375,864 | 3/1983 | Savage | 222/81 |
| 4,380,310 | 4/1983 | Scheiter et al. | 222/501 |

FOREIGN PATENT DOCUMENTS

| | | | |
|---|---|---|---|
| 155098 | 2/1954 | Australia | 141/351 |
| 438454 | 12/1926 | Fed. Rep. of Germany | 141/351 |

Primary Examiner—Houston S. Bell, Jr.

[57] ABSTRACT

This invention provides for a quick-disconnect coupling and valve assembly which consists of a single-service coupling and valve assembly and a connector for cooperating therewith. The single-service coupling and valve assembly is comprised of two main parts, namely, a spout fitment for a flexible bag and a valve member which slidably fits within the spout for axial movement. The valve member is provided with an outwardly-opening socket for receiving the connector and this socket has at least one dispensing outlet in the base thereof. In use, the valve member is normally in closed position with the outlet disposed within the spout axially-outwardly of an inner seal between the spout and valve member. A one-way stop arrangement permits axial inward movement of the valve member relative to the spout but prevents axial outward movement, the inward movement opening the valve by moving the outlet inwardly beyond the spout. This inward movement is accomplished by inserting the connector in the valve socket and pushing the valve member inwardly. At the same time, a gripper on the valve member is actuated to grip the connector so that subsequent axial-outward movement of the connector pulls the valve member axially-outwardly until it is stopped by the stop, so that the dispenser outlet is in thespout axially-outwardly of the inner seal. Continued outward movement of the connector, releases the gripper and permits withdrawal of the connector from the valve member socket.

19 Claims, 15 Drawing Figures

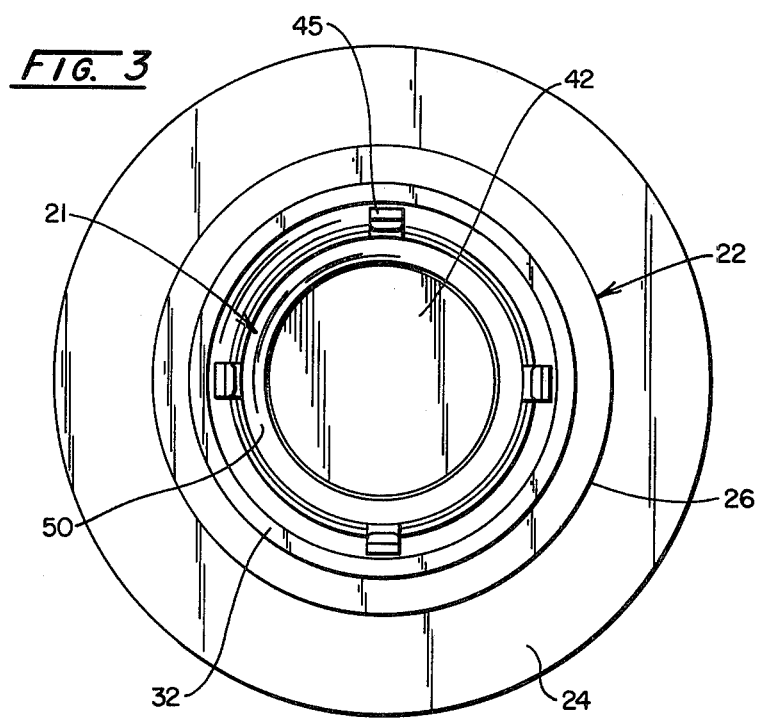
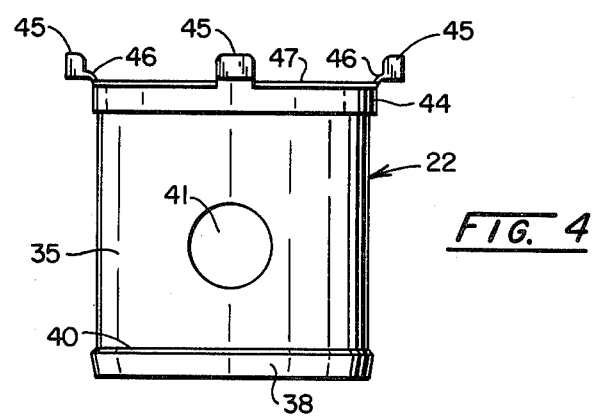

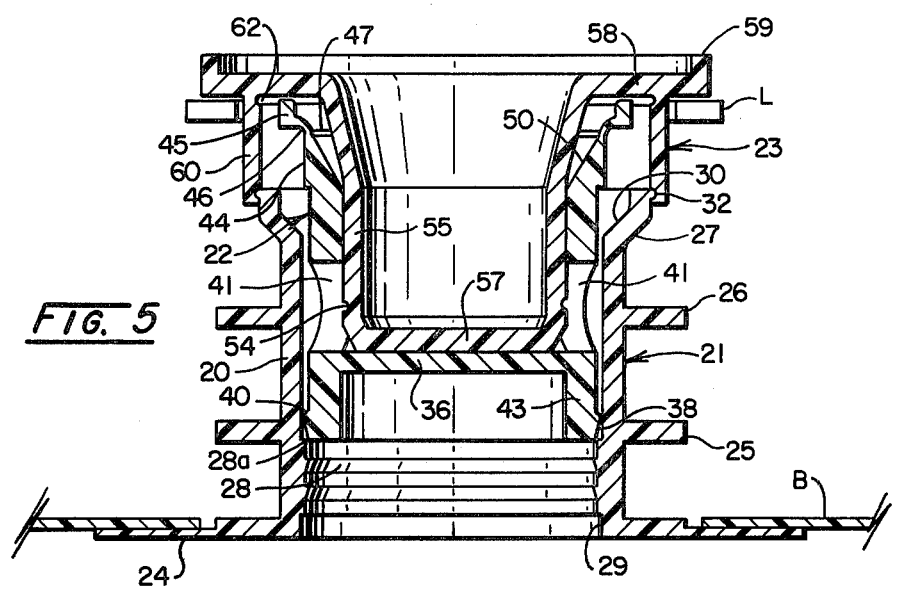
*FIG. 5*
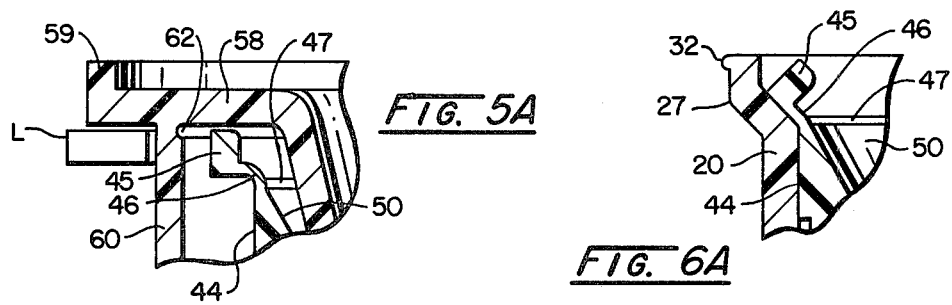
*FIG. 5A*  *FIG. 6A*
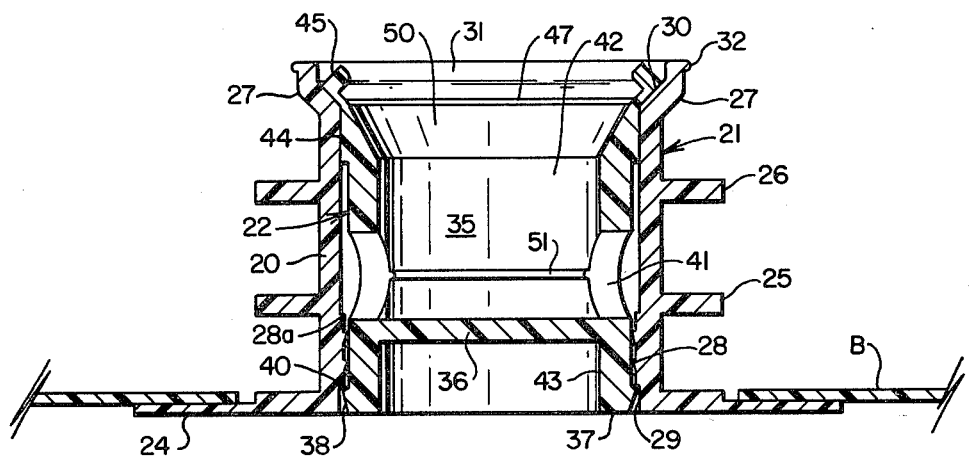
*FIG. 6*

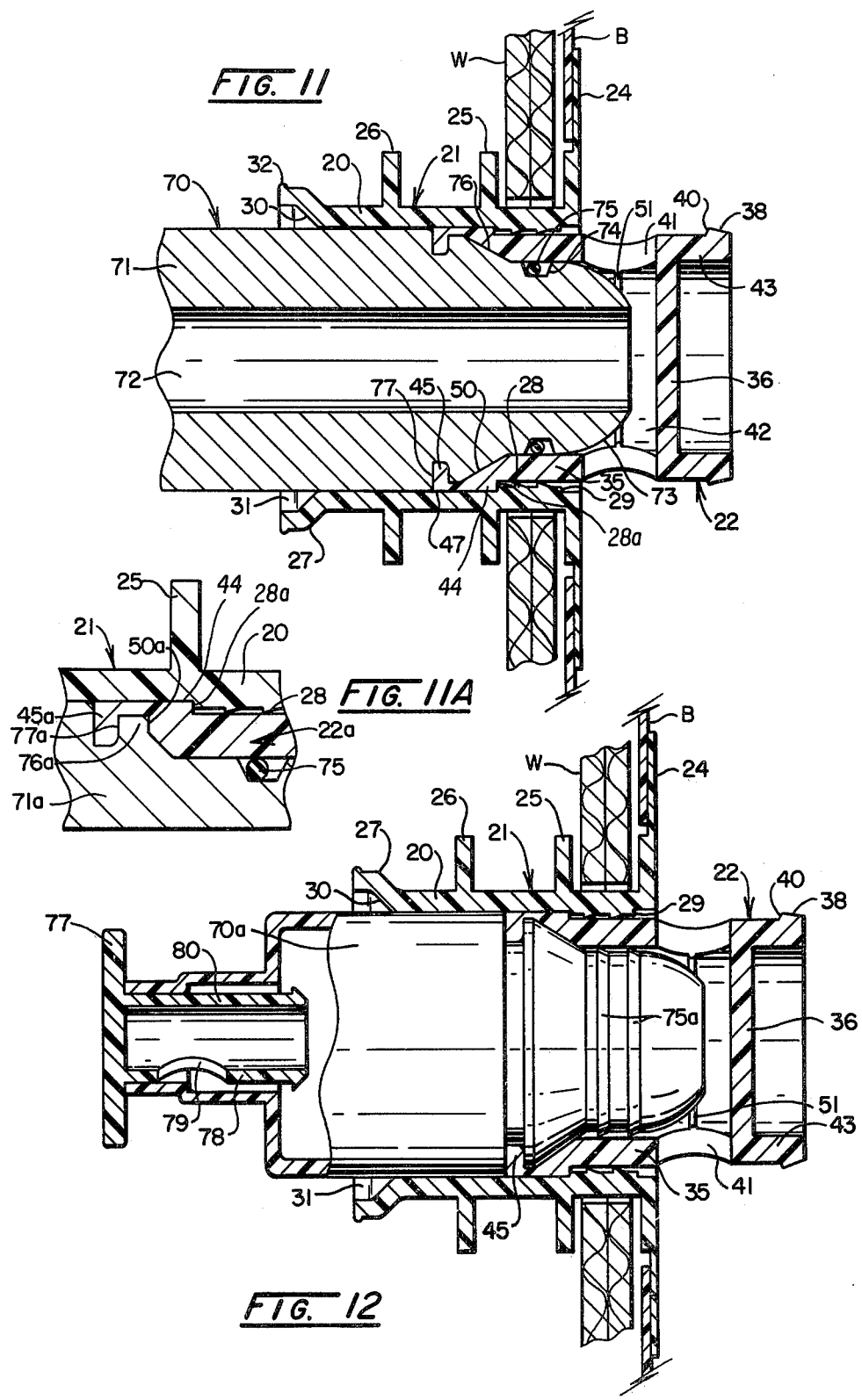

QUICK-DISCONNECT COUPLING AND VALVE ASSEMBLY

BACKGROUND OF THE INVENTION

The present invention deals with a quick-disconnect coupling and valve assembly which is especially useful, but not limited to, the dispensing of liquids and semi-liquids from a collapsible bag of a bag-in-box package by various beverage syrup dispensing systems.

Various systems are in use or have been proposed for dispensing beverage syrup from a disposable package consisting of a flexible collapsible bag in a corrugated box commonly referred to as a bag-in-box dispensing package. One such system capable of use with the bag-in-box is illustrated in U.S. Pat. No. 4,014,461. The bag is provided with a fitment in the form of a spout through which filling and dispensing occurs and it is desirable to provide a quick-disconnect coupling between the spout and the service line of the pump or other type of beverage mixing and dispensing system. One such coupling is carried on the spout fitment of the bag and works in conjunction with the service line connector, and is commonly called in the art a single-service valve and coupling since it is discarded with the bag when it is emptied. This valve opens automatically as the line connector is connected to the spout and closes as it is disconnected therefrom to prevent syrup from drawing from the bag. Such a single-service valve is illustrated in U.S. Pat. No. 4,286,636, which shows it in combination with a dip tube. However, it is of such a nature, including a coil or equivalent spring arrangement for closing the valve, that it is expensive to produce and after use for a period of time, has a tendency to weaken and to become clogged with the sticky syrup and, therefore, does not always automatically close to prevent drainage from the bag.

SUMMARY OF THE INVENTION

The present invention deals mainly with a single-service coupling and valve assembly which is carried by a fitment or spout of a flexible bag and with a service line connector or similar member for cooperating therewith. This connector could be part of the beverage pumping system but, as hereinafter indicated, it could be a connector used for a different purpose.

The single-service coupling and valve assembly, according to this invention, consists of a fitment or spout and a cooperating tubular valve member mounted therein for axial frictional sliding movement. The spout is generally similar to bag spouts now in common use for cooperating with the usual filler machines, etc. but has certain structural features for cooperating with the special valve member of the invention.

The valve member is in the form of a female socket member which has an outwardly-opening socket with a closed inner end. Outwardly of the closed inner end are one or more radial outlets which are normally within the spout so the valve is closed. When the valve member is mounted on the spout in use, friction means between the axially slidable valve member and the spout acts to normally keep the valve member in outward closed position where the outlets are disposed within the spout between an outer friction guide and an inner seal and stop at the inner end of the spout which permits inward axial movement but prevents outward axial movement. However, when the male connector of this invention, or similar member, is inserted in the female socket of the valve member, it has means to engage the valve member and push it further into the spout until its radial outlets move beyond the inner end of the spout which permits dispensing of the bag contents outwardly through the outlets and into the connector. The valve member has means which engage the grip the male connector when it pushes the valve member inwardly so that, as the connector is withdrawn, the valve member is positively moved axially outwardly to again position the outlets thereof in a sealed position within the spout. This also engages the inner seal and stop means, between the spout and valve member, to prevent further outward axial movement of the valve member so that its outlets remain sealed within the spout between the inner seal and outer guide to prevent drainage from the bag. Thus, no springs are required to close the valve when dispensing ceases and the connector is withdrawn. It is economic to discard the single-service connector with the bag since it is composed of only one part, the valve member, besides the spout fitment. Both of these parts can be molded from plastic economically.

When used in connection with a beverage dispensing system or for other uses where sanitation is important, a dust cap may be used to cover the product-engaging surfaces of the single-service coupling and valve assembly. This cap is formed to cover the valve member initially in an axially-extended position on the spout where it can be removed for filling of the bag and then in the inward sealed position where it is pushed with the dispensing outlets sealed within the spout.

BRIEF DESCRIPTION OF THE DRAWINGS

The best mode contemplated in carrying out this invention is illustrated in the accompanying drawings in which:

FIG. 3 is an enlarged plan view of FIG. 2;

FIG. 4 is a perspective view of the valve member;

FIG. 5 is an axial sectional view showing the assembly including a protective dust cap thereon;

FIG. 5A is an enlarged detail of the gripper lugs on the valve member in their initial position shown in FIG. 5 when the valve is axially outwardly;

FIG. 6 is an axial sectional view taken along line 6—6 of FIG. 2;

FIG. 6A is a view similar to FIG. 5A but showing the position of the gripper lugs when the valve member is pushed inwardly as in FIG. 6;

FIG. 11 is a similar view to FIG. 10 but showing the connector after it has moved the valve to dispensing position;

FIG. 11a is a section showing a modification of the connector; and

FIG. 12 is a view similar to FIG. 11 but showing a modified form of male connector which has a manual valve carried thereby.

DETAILED DESCRIPTION OF THE INVENTION

With reference to the drawings in detail, the single-service coupling and valve assembly of this invention is shown in FIGS. 1 to 4 as comprising two main parts, mainly, a spout fitment 21 for attachment to a flexible plastic bag, and a valve member 22 which telescopes therein. If it is necessary to protect product surfaces of this assembly during the shipping and storage, a third part, namely a dust cap 23, shown in FIGS. 5 and 8, may be used. All of these parts can be molded inexpensively from plastic and since a minimum number of parts are used, the assembly can be manufactured at a low cost and it will be economic to discard it after a single use.

Figure 7:
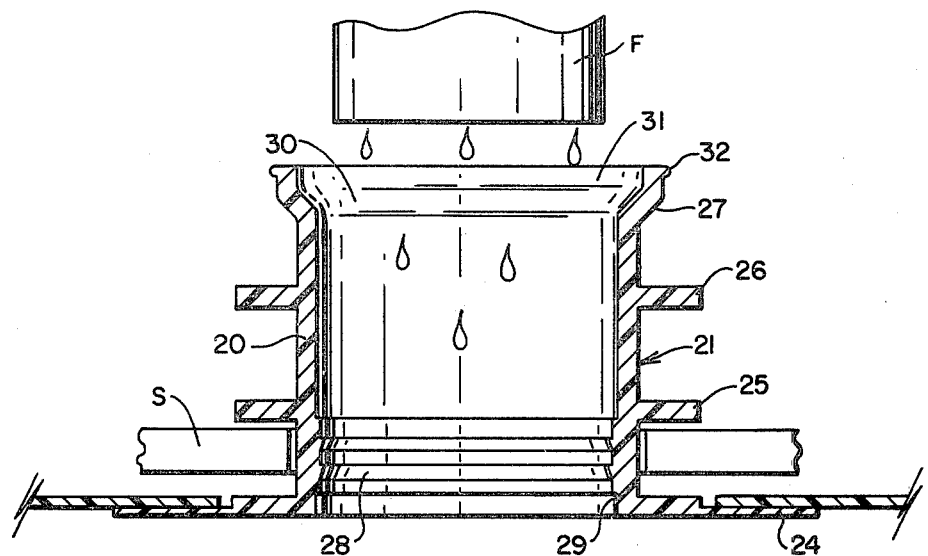
FIG. 7 is a schematic view with the valve member removed from the spout during filling.
Figure 8:
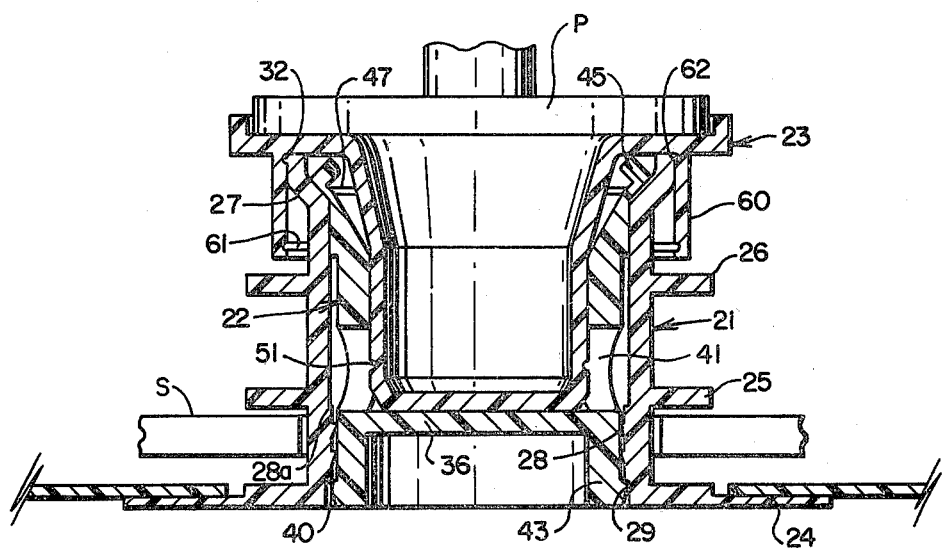
FIG. 8 is an axial sectional view illustrating how the dust-cap and valve member are repositioned on the spout.
Figure 10:
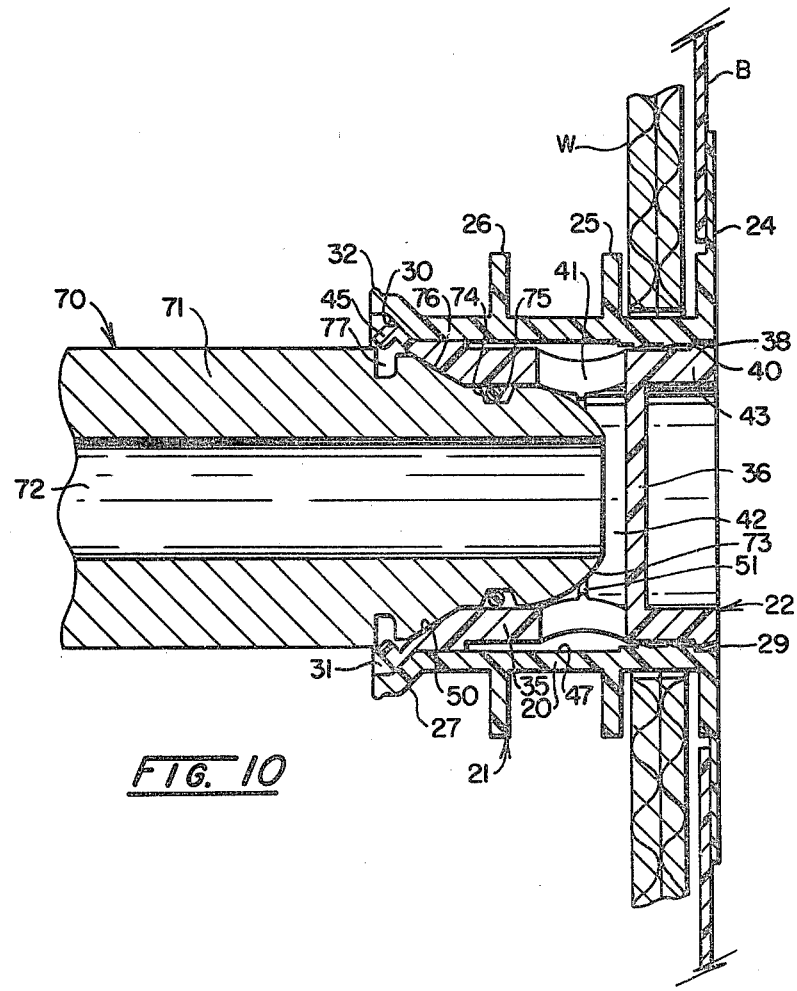
FIG. 10 is an axial sectional view of a part of a male connector used in conjuction with the single-service coupling and valve assembly for selectively positioning the valve member in its dispensing and closed positions.

The spout is formed, in general, like the spouts now commonly in use on bags of bag-in-box packages consisting of a tubular body 20 open at both its inner and outer ends and having the usual attaching flange 24 which extends peripherally on its inner end and which is sealed to the bag B in the usual manner as indicated in FIGS. 5 and 6. Axially-outwardly of the flange 24 is a second peripheral flange 25 which along with flange 24 is used in handling the bag by the spout clamps during filling and capping, as indicated in FIGS. 7 and 8, and in mounting the spout in a wall W of a corrugated box in the usual manner, as indicated in FIGS. 10 to 12. A third peripheral flange 26 is shown outwardly of flange 25 but is used with a part of the beverage service system not shown. The ends of the tubular body 20 of the spout are of special formation according to this invention.

As indicated best in FIGS. 1, 2, 3, 5 and 6, the upper or outer end of the body 20 is flared, as at 27, to provide at its inner side an annular angularly-extending cam throat surface 30 and an upstanding annular flange 31. At the upper or outer extremity of the flange 31, an outwardly-projecting periheral cap locking lip 32 may be formed.

The lower portion of the interior of the body 20 is provided with seal and stop means in the form of a plurality of annular sealing rings 28 formed at axially-spaced intervals within the inner and lower end of the spout body 20 and lowermost sharp annular stop shoulder 29 is formed at the lowermost extremity of the spout body. Outwardly of the outermost annular sealing ring 28 is an annular stop shoulder 28a.

The valve member 22 is illustrated best in FIGS. 1 to 6 and consists of a substantially cylindrical tubular body 35 which is open at its outer or upper end and closed at its inner or lower end. The closing of the lower end is effected by means of a transverse wall 36 which is recessed upwardly relative to the lower extremity 37 of the body. At this lower extremity on the exterior surface of the body, is formed an annular downwardly and inwardly tapering band 38 which provides a sharp annular stop shoulder 40 spaced upwardly from the extremity. Shoulder 28a on spout body 20 will contact band 38 to create friction to resist inward movement of valve member 22 but can be overcome by sufficient inward push on the valve member. Directly above the wall 36, diametrically-opposed dispensing outlets 41 are formed in the valve body 35 which are located at the bottom or inner end of the connector-receiving socket 42 of the valve member. Thus, there is provided an axially-inwardly extending of depending sealing skirt 43, beyond the outlets 41, which carries the band 38.

At the upper or outer end of the valve body 35, a gripper arrangement is provided which is adapted to cooperate with the inwardly-tapered cam or contact surface 30 of the spout and with the male connector or other member which is to be inserted in the female socket 42 in a manner to be described in detail. This arrangement is shown as including a friction and guide band 44 formed on the outer surface of the valve body 35 at the outer extremity thereof. At angularly spaced positions on this band, gripping lugs 45 are resiliently carried, four being shown but any suitable number being provided. The lugs 45 are normally in the position shown in FIG. 4 and their shape and mounting is illustrated more clearly in FIGS. 5A and 6A. Each lug is substantialy L-shaped in vertical cross-section and its lower radially-inwardly directed leg is attached by a resilient connector fingers 46 to the band 44 at the outermost extremity of the valve body 35. The inner surface of the valve body 35, just axially inwardly of its outermost extremity, is formed with an inwardly-tapered guide and bearing surface 50 and this produces a relatively sharp extremity on the valve body where the fingers 46 are connected to the slightly radially projecting band. Between these fingers and the band 44 is provided with radially outwardly-extending friction increasing lips 47.

Figure 1:
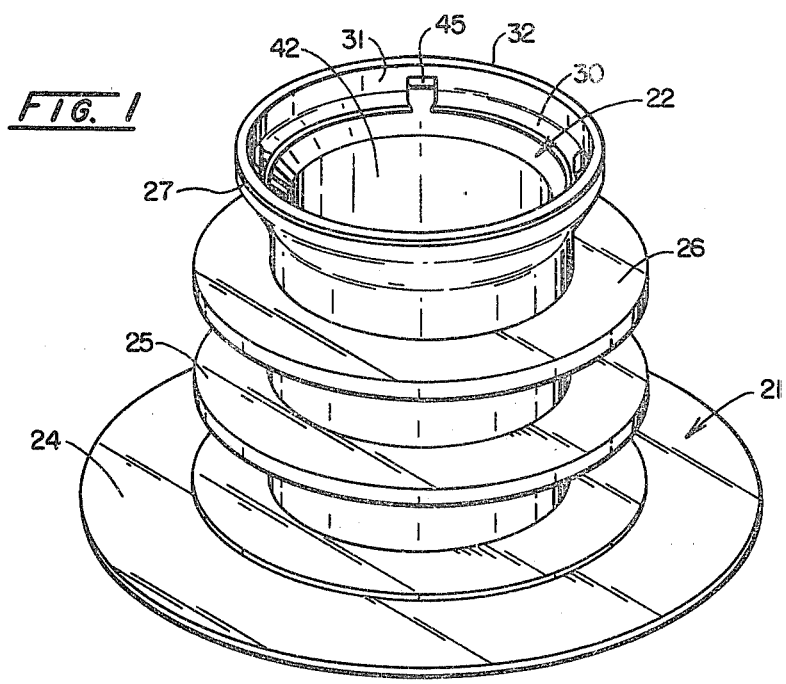
FIG. 1 is a perspective view of the single-service or disposable coupling and valve assembly of this invention with the valve member in its closed position.
Figure 2:
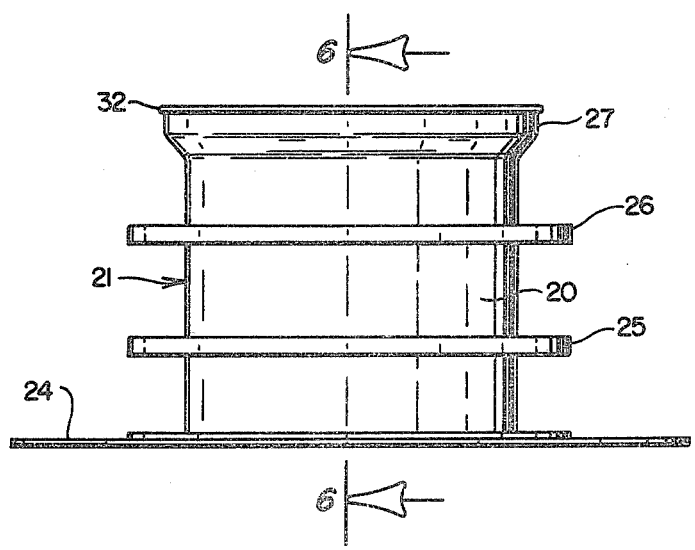
FIG. 2 is a side-elevational view of the assembly of FIG. 1.

In assembling the coupling and valve assembly for use, assuming the spout 21 is attached to the bag B, the valve member 22 is telescoped partially within it as shown in FIGS. 1 and 5. The cam surface 30 on the interior of the spout body 20 and the tapered band surface 38 on the inner end of valve member 22 will cooperate in guiding the valve member into a tight slidable friction fit with the interior surface of the spout body, the contact being at the annular shoulder 40 on valve skirt 43 and normally valve member 22 will remain in this axial position. This shoulder 40 will be axially outwardly of the sealing rings 28 on the spout body surface at this time, as shown in FIG. 5, and the lugs 45 of the valve member will be extending axially outwardly since the resilient fingers 46 have not been bent. This is the condition of the assembly on the bag B prior to filling the bag and as supplied to the user. The valve member 22 may be held in this extended position by this tight friction fit of it within the interior surface of the spout 21. But when pushed inwardly, band 38 will be constricted slightly to pass shoulder 28a, rings 28 and shoulder 29.

If it is desired to cover the product contacting surfaces of the spout 21 and valve member 22 for sanitary reasons, the dust cap 23 shown in FIGS. 5 and 8 may be used. In FIG. 5, the cap 23 is shown positioned on the extended valve member. The cap is shown as including a hollow body 55 with an inner plug portion adapted to fit tightly within the valve body 35. An inner wall 57 engages the transverse wall 36 of the valve member. The exterior surface of the body 55 is provided with an annular groove 54 for receiving the rib 51 on the valve member and although these interfit to normally hold these two members together, they can be readily released by relative axial pressure, since they are of cooperating circular cross-section. At its outer end, the cap body 55 has a peripheral radially-extending flange 58 which has an outwardly-extending or upstanding annular lip 59 at its outer edge. Spaced slightly within this outer edge, is an inwardly-directed or depending flange 60. This flange, at its extremity and in its inner surface, has an annular groove 61 adapted to receive the lip 32 (FIG. 5) of the spout body 20 and, at its junction with flange 58, has another annular groove 62 for receiving that lip (FIG. 8) after filling of the bag B and closing the valve.

When the bag is to be filled, the cap 23 and valve 22 are removed from the spout 21 as a unit. This can be accomplished on the usual filling machine by clamping the spout with the usual clamp, indicated schematically at S in FIG. 7, and lifting the unit from the spout by a suitable attachment, indicated schematically at L in FIG. 5, which engages with the underside of the flange 58 of the dust cap 23. This will release flange 60 from the lip 32 of spout 21 but the cap body 55 and valve body 35 will still remain connected as a unit at the interfitting groove 54 and rib 51. With the cap and valve assembly out of the spout 21, the filling of the bag may take place, as indicated in FIG. 7, where a filler nozzle is indicated schematically at F. After filling, the unit comprising the cap 23 and valve member 22 with the valve member still extended in the position indicated in FIG. 5, is reinserted in the spout 21. With a suitable plunger, indicated schematically at P, the unit is passed axially inwardly into the spout. This moves the cap and valve unit axially inwardly into the spout to the position shown in FIG. 8. By this movement the groove 61 of cap flange 60 is disengaged from lip 32 on the spout end and the flange 58 thereof is moved into contact with that spout end. Simultaneously, the extended valve body 35 is moved inwardly until it locking shoulder 40 snaps behind the locking shoulder 29 on the spout body 20, it being understood there is some resiliency in valve skirt 43. This axial inward movement of the valve member 22 into the spout 21 also brings the outer surface of skirt 43 into sealing engagement with sealing rings 28 on the spout body 21 and the guide band 44 on the upper end of the valve body 35 into guiding contact within the upper end of the spout body. Thus, at this time, dispensing outlets 41 are between the upper band 44 and the lower seal at 28. The valve member 22 now cannot be moved axially outwardly from this position and, consequently, drainage from the bag will be prevented. At the time that the valve member 21 is pushed inwardly farther into the spout from its extended position as just described, the radially-extending lugs 45 on the valve member will engage the cam surface 30 on the spout and will, swing inwardly slightly as indicated in FIG. 8. However, at this time, they will perform no function. The one-way lock provided by shoulders 29 and 40 will permit farther inward axial movement by pushing axially inwardly on the valve member 22 to overcome the friction between it and the spout.

If no dust cap is to be used, it will only be necessary to remove the extended valve member 22 from the position shown in FIG. 5, where it will be held by friction as indicated, perform the filling operation, and then reinsert it in the spout 21 to the position shown in FIG. 6. A plunger similar to that shown in FIG. 5 may be used in this operation, but it will fit in the socket 42 of the valve member. The valve member 22 could be supplied separate from the spout and be inserted after filling of the bag.

Figure 9:
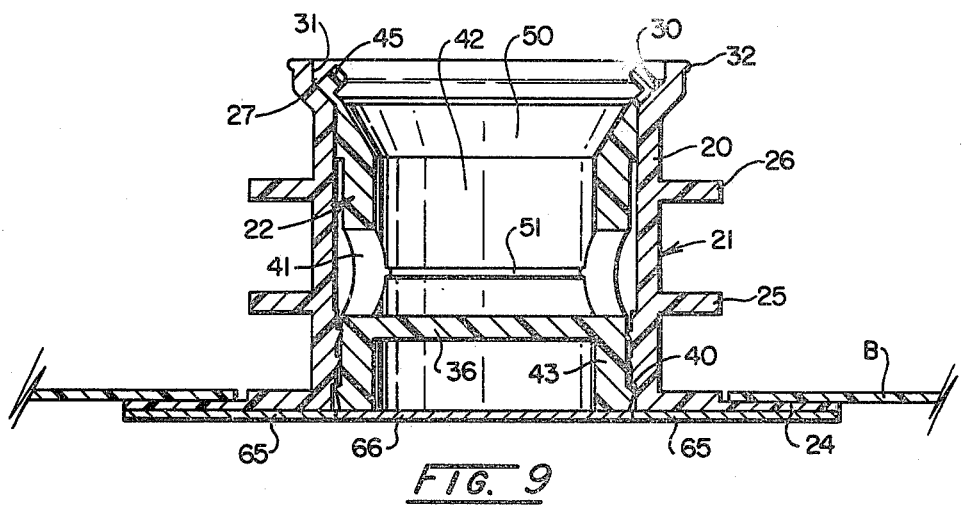
FIG. 9 is a view similar to FIG. 6 but showing the spout and cap with barrier means to aid in reducing oxygen-penetration into the bag.

As described in the copending application of Bond, Ser. No. 200,528, filed Dec. 24, 1980, now U.S. Pat. No. 4,362,255 it is sometimes desirable to provide a barrier film or coating on the attaching flange 24 of the spout, where it is sealed to the bag B, to aid in preventing penetration of oxygen at this area if the bag is also of barrier material. Such an arrangement is shown in FIG. 9 in the form of annular ring or coating 65 of barrier material which is disposed beneath the flange 24 and extends to the inner surface of the spout body 20. Also, covering the inner end of the valve member 22, by attaching to the extremity of the skirt 43 thereof, is a disc 66 of similar barrier material which will fit tightly within the barrier ring 56 when the valve member 22 is in closed position. Thus, members 65 and 66 will greatly aid in preventing oxygen penetration at the spout with the valve in closed position.

Thus, the filled bag B will have the coupling and valve assembly mounted thereon with the valve closed and sealed. If it is desired to dispense from the bag and the cap 23 is in place in the manner shown in FIG. 8, the cap is removed by withdrawing it axially outwardly, the valve member 22 staying in the inner position within the spout 21, as indicated, because of the one-way lock between these members at the shoulders 40 and 29. The cap will be released at lip 32 and 51, leaving the valve member 22 in its inner sealed position as shown in FIGS. 6, 8 and 9.

To dispense the contents of the filled bag B, it is necessary to insert a male member in the outwardly-opening valve socket 42 to overcome friction and push the valve member 22 inwardly so that the outlets 41 move inwardly of the inner end of the spout 21. Such a member, formed according to this invention of a suitable plastic such as nylon, is indicated generally at 70 in FIGS. 10 and 11 and could be the connector to a service line of a beverage dispensing system. This connector member 70 is shown as having a body 71 of tubular form with a central dispensing passageway 72 extending therethrough. The form of the outer end is not completed as it may take various forms not important to this invention. For example, it could be part of a standard threaded connector (not shown) or be fixed to the service line. However, the formation of the leading end which is inserted into the valve socket 42 is important to this invention. The leading end or tip 73 of the connector body 71 is of hemispherical form so it will be guided into the socket 42 by the tapered surface 50 at the outer end, thereof. The hemispherical tip 73 merges with a cylindrical sealing surface 74 which has an O-ring 75 mounted in an annular groove formed therein. Outwardly of this surface 74 is a frusto-conical bearing surface 76 complemental to the bearing surface 50 of the valve member and just beyond this surface is an annular gripper lug-receiving groove 77. The groove 77 is formed in the main part of the body 71 which has a diameter just slightly less than that of the internal diameter of the spout body 20.

In the initial insertion of the connector member 70 into the valve socket 42 (FIG. 10), the lugs 45 are missed by the body 71 thereof since the lugs will be outwardly in contact with cam surface 30 on the end of the spout body 20, as shown in FIG. 6. No movement of the valve member 22 will occur until the frusto-conical surface 76 of the body 71 engages the tapered socket surface 50 of the valve body 35, as shown in FIG. 10. At this time, there will be a seal produced between the O-ring 75 and the interior surface of the valve body.

The lips 47 at the extremity of the valve body 35 tend to resist movement of it into the spout body 20 until the complemental surfaces 76 and 50 are in firm contact, and this occurs before the tip 73 reaches valve wall 36. As soon as contact is made (FIG. 11), the valve body is pushed farther inwardly which will move the lugs 45 inwardly on the cam surface 30 and thereby swing them inwardly into the groove 77 to grip the valve 22 to the connector 70. Inward movement of the valve member, moves the dispenser outlets 41 beyond the inner end of the spout body 20 so that the contents of the bag can then pass into said outlets, through valve socket 42 and out through the connector passage 72. It will be noted that when surfaces 76 and 50 are in contact, outlets 41 are not covered by the rounded tip 23. Inward movement of the valve body is limited by contact of the annular shoulder at the inner side of band 44 with stop shoulder 28a on the spout body 20, as shown in FIGS. 11 and 11A. At this time, the gripper lugs 45 are still within the spout body. Whenever the connector 70 is withdrawn from the valve and coupling assembly, the valve 22 is pulled outwardly to its closed sealed position within the spout 21, the condition illustrated in FIG. 6. As the connector is withdrawn axially outwardly, the valve member 22 is moved therewith since it is gripped thereto by the gripping lugs 45 which are still in groove 77. This movement continues until the stop shoulder 40 on the valve body strikes the stop shoulder 29 on the spout body. This results in the dispenser outlets 41 being again positioned within the spout body 20 between the inner seal 28 and the outer band 44, to prevent further discharge of the bag contents. As the gripper lugs 45 reach the flared upper end 27 of the spout body during withdrawal of the connector 70, they will automatically swing outwardly against the surface 30 out of the groove 77 to release the member 70. Thus, the valve member 22 is automatically moved into outward closed position anytime the connector 70 is withdrawn and the valve member will be held in outer closed position by friction at the band 44 and sealing rings 28 until it is again pushed inwardly by insertion of the member 70.

Instead of having only contact surfaces 50 and 76 on the valve member 22 and connector 70, the contact arrangement shown in FIG. 11a may be provided. The valve body 22a is provided with a blunt outer end 50a which provides an annular shoulder or surface engaged by annular peripheral lug 76a formed on connector body 71a. These contact portions engage just before lugs 45a swing into groove 77a, thus, this is another means of getting firm contact between the connector and the valve member.

As indicated previously, the connector member 70 used in connection with the single service coupling and valve assembly is not necessarily used on a service line of a beverage dispensing system. In FIG. 11, there is illustrated an arrangement where it directly supports a dispensing valve.

It is sometimes desirable to dispense contents directly from the bag B. For this purpose the member 70a could carry a suitable dispensing valve on its outer end. For example, it could carry a slideable dispensing valve of the type shown in U.S. Pat. No. 3,223,117. In that case, the outer end of the tubular connector member 70a would have a valve guide 78 formed at its outer end to slidably receive the tubular valve member 80 which has a radial dispensing outlet 79 adapted to be brought from closed sealed position axially within the guide by button 77. However, any other suitable type of dispensing valve could be substituted. This would permit dispensing from the bag-in-box directly without connecting into a pumping or other service system. In this example, instead of the O-ring seal a plurality of sealing rings 75a are provided on the tip of the member 70a.

It will be apparent from the above that this invention provides for a quick-disconnect coupling and valve assembly which consists of a single-service coupling and valve assembly and a connector for cooperating therewith. The single-service coupling and valve assembly is comprised of two main parts, namely, a spout fitment for a flexible bag and a valve member which slidably fits within the spout for axial movement. The valve member is provided with an outwardly-opening socket for receiving the connector and this socket has at least one dispensing outlet in the base thereof. In use, the valve member is normally in closed position with the outlet disposed within the spout axially-outwardly of the inner seal between the spout and valve member. A one-way stop arrangement permits axial inward movement of the valve member relative to the spout but prevents axial outward movement, the inward movement opening the valve by moving the outlet inwardly beyond the spout. This inward movement is accomplished by inserting the connector in the valve socket and pushing the valve member inwardly. At the same time, gripping means on the valve member is actuated to by cam means on the spout grip the connector so that subsequent axial-outward movement of the connector pulls the valve member axially-outwardly until it is stopped by the stop means, so that the dispenser outlet is in the spout beyond the inner seal. Continued outward movement of the connector, releases the gripping means and permits withdrawal of the connector from the valve member socket.

As indicated, a dust cap may be provided for removably covering the product-contacting surfaces of the spout and valve member. This cap is so formed that it will cover the valve member and spout when the valve member is partially extended from the spout before filling of the bag or when the valve member is completely telescoped within and locked in the spout after filling of the bag.

We claim:

1. A coupling and valve assembly comprising a spout having an annular tubular body open at its inner and outer ends, a valve member having an annular tubular body telescoped in the spout body and axially-slideable therein and having a closed inner end and an open outer end to provide an outwardly-opening socket for receiving a connector with the valve body having a dispenser outlet leading into the socket, a seal between the valve body and spout body axially inwardly of the dispenser outlet, one-way stop means between the valve body and spout body which prevents axial outward movement of the valve body in the spout body to keep the seal between the valve body and spout body but permits axial inward movement of the valve body relative to the spout body to move the dispenser outlet axially inwardly of the inner end of the spout body to permit dispensing through said outlet and said socket; a gripper arrangement at the outer end of the valve body and spout body for gripping the connector upon insertion into the socket and movement of the valve body axially inwardly into the spout body; said gripping arrangement comprising cam means at the outer end of said spout body and radially-movable yieldable gripping means at the outer end of the valve body normally engaging said cam means in a radially-extended position but movable positively radially inwardly by the cam means to grip the connector upon movement of the valve body axially inwardly of the spout body by the connector so as to move the outlet inwardly beyond the inner end of the spout body and to pull the valve body axially-outwardly to move the outlet into the spout body outwardly of said seal upon retraction of the connector from the spout body.

2. A coupling and valve assembly according to claim 1 in which said radially movable yieldable gripping means is resiliently carried on the outer end of said valve body and said cam means is an inwardly-tapered surface at the outer end of the spout body against which the gripping means normally expands, and a second one-way stop means between the spout body and valve body for limiting inward movement of the valve body so that the gripping means carried thereby is still within the spout body.

3. A coupling and valve assembly according to claim 2 in which the gripping means comprises a plurality of resilient fingers of the extremity of the valve body at angularly spaced positions which carry radially-inwardly directed gripper lugs and said cam surface is an annular inwardly-tapered surface on the extremity of the spout body over which the fingers normally expand in resilient engagement therewith so as to move the lugs to non-gripping position but which will be moved positively to radially contract the lugs into gripping position when the valve body is moved axially into the spout.

4. A coupling and valve according to claim 2 in which said inner seal comprises an annular seal at the inner end of said valve body between it and the spout body, said dispenser outlet consisting of at least one opening extending radially through the tubular body into said socket, the first one-way stop means comprising an annular inner shoulder on said valve body which is located inwardly of said dispenser outlet and an annular inner stop shoulder on said spout body at the inner end thereof engaged thereby, the second one-way stop means comprising an outer annular stop shoulder on said valve body outwardly of the dispenser outlet and an annular outer stop shoulder on said spout body spaced axially-outwardly from the inner one.

5. A coupling and valve assembly according to claim 4 in which the valve body socket has its inner end formed by a transverse wall spaced from the inner end of the tubular valve body to provide an axially inwardly extending flexible skirt, said skirt having an annular exterior sealing surface which carries the valve body stop shoulder of the first one-way stop means, said spout body having an inner extremity at which the spout body stop shoulder of the first one-way stop means is carried and having at least one sealing ring outwardly of said shoulder for cooperating with said skirt sealing surface to form said inner seal, said valve body having an exterior band on its outer surface adjacent its outer end which provides the outer annular valve body stop shoulder of the second one-way stop means at its inner extent.

6. A coupling and valve assembly according to claim 5 in which the gripping means is provided by a plurality of resilient fingers carried on the outer extremity of the band which is at the outer end of the spout body, said fingers being disposed at angularly spaced positions on the band and carrying radially-inwardly directed gripper lugs, and said cam surface is an annular inwardly tapered surface on the extremity of the spout body over which the fingers normally expand in resilient engagement therewith so as to move the lugs to non-gripping position but which will be positively moved to radially contract the lugs into gripping position when the valve body is moved axially into the spout.

7. A coupling and valve assembly according to claim 6 in which the valve body socket has an annular tapered contact surface at the upper end thereof to provide a sharp extremity on the upper end of the valve body and a flared mouth for the socket, said band being provided between the fingers thereon with radially outwardly-extending lips to increase the friction between the valve body and the spout.

8. A coupling and valve assembly according to claim 5 in which the spout is of plastic and has an attaching flange over the upper surface of which a flexible plastic bag is attached, said bag being formed of barrier material to resist oxygen penetration, barrier material on the lower surface of the flange and overlapping the bag material, and said valve member having barrier material secured to the skirt thereof to cover the end of the valve to aid in reducing oxygen penetration into the bag.

9. A coupling and valve assembly according to claim 2 including a connector having a dispenser passageway extending therethrough which is inserted in said outwardly-opening socket of said valve body to push it axially inwardly in the spout body from its closed position where the dispenser outlet is within the spout body to its opened position where the dispenser outlet is inwardly of the inner end of the spout body, said connector and valve socket having contact surfaces which engage with each other as the connector is inserted in the socket, said yieldable gripping means on the valve body being actuated by axial movement into the socket of the connector for gripping the connector after the contact surfaces are engaged to move the valve body axially inwardly to opened position until the second one-way stop means is engaged and which is released by withdrawal of the connector from the socket after the contact surfaces are separated and the valve body is pulled axially outwardly to closed position with said first one-way stop means engaged.

10. A coupling and valve assembly according to claim 9 in which said contact surfaces are complementally tapered contact surfaces on the connector and valve socket.

11. A coupling and valve assembly according to claim 9 in which the tapered surface of the valve member has an annular shoulder at its outer extent for engaging a similar shoulder at the outer extent of the surface of the connector member.

12. A coupling and valve assembly according to claim 10 in which the contact surface on the valve socket is an annular inwardly-tapering surface at the mouth of the socket into which the tip of the connector enters and the contact surface of the connector is a frusto-conical surface behind the tip complemental to the tapered surface.

13. A coupling and valve assembly according to claim 12 in which the tip also has an annular shoulder projecting from said frusto-conical surface for engaging the valve body at its extremity.

14. A coupling and valve assembly according to claim 12 in which the said gripper means comprises radially-directed gripper lugs carried by resilient fingers attached at the outer extremity of said valve body which are normally positioned radially-outwardly, said cam surface being engaged by said gripper lugs as the connector inserted in the valve body socket pushes the valve body axially inwardly, said connector having an annular groove formed therein directly axially outwardly of its frusto-conical contact surface to receive said lugs a they are moved radially-inwardly by contact with said cam surface upon axial inward movement of the valve body.

15. A coupling and valve assembly according to claim 14 in which the connector has a body which outwardly of its frusto-conical contact surface is cylindrical and is of a diameter to tightly slidably fit in the spout body, said spout body having an inner extremity at which the stop shoulder of the first one-way stop means is carried and having at least one annular sealing ring outwardly of said shoulder for cooperating with a sealing surface on an inwardly extending flexible skirt extending axially-inwardly beyond the closed end of the socket of sad valve body, said skirt carrying said valve body stop shoulder of the first one-way stop means and sealing means between the tip of said connector and said valve body inwardly of said tapered contact surface.

16. The combination of claim 9 in which the connector has a manually-actuated dispensing valve mounted thereon.

17. The combination of claim 16 in which the connector has a valve guide formed thereon communicating with said passageway, and a dispensing valve member slidably mounted in said valve guide for axial movement, said valve member having a dispenser outlet movable from a closed position within the guide to a dispenser position outwardly of the guide.

18. A coupling and valve assembly according to claim 3 including a dust cap for covering the outer end of the spout body and the valve body, said cap having a body extending axially into the valve body socket, a peripheral flange which extends radially outwardly over the outer extremities of the valve body and spout body, and an attaching flange extending axially inwardly from said peripheral flange and telescoping over the outer extremity of the spout body.

19. A coupling and valve assembly according to claim 18 including releasable friction means for connecting the body of the cap in the valve body socket and releasable friction means for connecting the attaching flange selectively in an axial inner or outer position on the spout body extremity depending on whether the valve member is in an axially inward retracted position within the spout body or an axially extended position out of the spout body.

* * * * *